United States Patent
Schwarz

(10) Patent No.: US 11,192,260 B2
(45) Date of Patent: Dec. 7, 2021

(54) SET-UP ARRANGEMENT AND METHOD FOR SETTING UP A MOBILE AUTOMATION

(71) Applicant: Siemens Aktiengesellschaft, Munich (DE)

(72) Inventor: Andreas Schwarz, Kalchreuth (DE)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 16/035,106

(22) Filed: Jul. 13, 2018

(65) Prior Publication Data
US 2020/0016768 A1 Jan. 16, 2020

(30) Foreign Application Priority Data

Jul. 13, 2017 (EP) .................................... 17181212

(51) Int. Cl.
*G05B 15/00* (2006.01)
*B25J 13/08* (2006.01)
*B25J 9/16* (2006.01)

(52) U.S. Cl.
CPC ........... *B25J 13/085* (2013.01); *B25J 9/1664* (2013.01)

(58) Field of Classification Search
CPC ...... B25J 13/085; B25J 9/1664; B25J 9/0051; B25J 9/00; B25J 9/0009; B25J 9/16; G05B 19/423; G05B 2219/45083; G05B 19/41; G05B 19/42; G05B 19/425; G05B 2219/45104; G09B 25/02
USPC ................. 700/247, 255, 260; 74/2, 490.01; 901/40; 414/222.02; 307/326
See application file for complete search history.

(56) References Cited

U.S. PATENT DOCUMENTS

| | | | | |
|---|---|---|---|---|
| 4,275,986 A * | 6/1981 | Engelberger | .......... | B23P 21/002 414/4 |
| 6,543,987 B2 * | 4/2003 | Ehrat | .................. | B25J 15/0616 414/729 |
| 6,896,473 B2 * | 5/2005 | Schuler | ................ | B25J 17/0266 403/109.1 |
| 8,047,093 B2 * | 11/2011 | Kinoshita | ............ | B25J 17/0266 74/490.03 |

(Continued)

FOREIGN PATENT DOCUMENTS

| CN | 1846181 | 10/2006 |
|---|---|---|
| CN | 104552284 | 4/2015 |

(Continued)

OTHER PUBLICATIONS

DE202016007293U1—English Translation (Year: 2017).*

(Continued)

*Primary Examiner* — B M M Hannan
(74) *Attorney, Agent, or Firm* — Cozen O'Connor

(57) ABSTRACT

A setting-up arrangement and a method for setting up a mobile automaton includes at least the steps of a) coupling a movable element of the mobile automaton to a movable guide element of a guide device, b) exerting a force on the movable element via the movable guide element by operating the guide device, by which the movable element is moved in a guided manner along a predetermined movement profile via the guide element, c) acquiring a setup dataset characterizing the movement profile and, as a result, setting up the mobile automaton.

13 Claims, 1 Drawing Sheet

(56) References Cited

U.S. PATENT DOCUMENTS

| | | | |
|---|---|---|---|
| 9,043,025 B2* | 5/2015 | Brooks | B25J 9/1676 |
| | | | 700/255 |
| 2004/0211284 A1* | 10/2004 | Roy | B23Q 1/5456 |
| | | | 74/490.01 |
| 2004/0257021 A1 | 12/2004 | Chang et al. | |
| 2004/0261179 A1* | 12/2004 | Blumenkranz | A61B 34/70 |
| | | | 5/630 |
| 2005/0172750 A1* | 8/2005 | Kock | B25J 17/0266 |
| | | | 74/490.01 |
| 2006/0020811 A1 | 1/2006 | Tan | |
| 2006/0245894 A1* | 11/2006 | Merz | B25J 9/104 |
| | | | 414/680 |
| 2008/0109115 A1* | 5/2008 | Lim | B62D 57/032 |
| | | | 700/258 |
| 2008/0141813 A1* | 6/2008 | Ehrat | B25J 17/0266 |
| | | | 74/490.01 |
| 2009/0037025 A1* | 2/2009 | Yamamoto | B25J 9/1664 |
| | | | 700/264 |
| 2011/0126660 A1* | 6/2011 | Lauzier | B25J 17/0266 |
| | | | 74/490.05 |
| 2012/0207574 A1* | 8/2012 | La Rovere | B25J 15/00 |
| | | | 414/751.1 |
| 2013/0228031 A1* | 9/2013 | Gerat | B25J 18/00 |
| | | | 74/490.03 |
| 2013/0345868 A1* | 12/2013 | One | B23K 9/095 |
| | | | 700/252 |
| 2014/0067121 A1* | 3/2014 | Brooks | B25J 9/1676 |
| | | | 700/255 |
| 2014/0316568 A1* | 10/2014 | Park | B25J 9/1664 |
| | | | 700/254 |
| 2015/0066200 A1* | 3/2015 | McCarthy | B07C 5/3422 |
| | | | 700/223 |
| 2015/0104284 A1 | 4/2015 | Riedel | |
| 2016/0057134 A1 | 2/2016 | Falk et al. | |
| 2016/0129595 A1* | 5/2016 | Gerio | B25J 13/088 |
| | | | 700/255 |
| 2017/0054566 A1 | 2/2017 | Nitschke | |
| 2017/0190052 A1* | 7/2017 | Jaekel | B25J 9/1664 |
| 2018/0200879 A1* | 7/2018 | Imle | B25J 9/0072 |
| 2018/0281202 A1* | 10/2018 | Brudniok | B25J 15/0033 |
| 2020/0016768 A1 | 1/2020 | Schwarz | |
| 2020/0197108 A1* | 6/2020 | Usui | A61B 34/37 |

FOREIGN PATENT DOCUMENTS

| | | | |
|---|---|---|---|
| CN | 104827473 | 8/2015 | |
| DE | 19943318 | 3/2001 | |
| DE | 102013205051 | 9/2014 | |
| DE | 102014102168 | 9/2015 | |
| DE | 202016007293 U1 * | 2/2017 | B25J 1/00 |
| JP | 2008-254097 | 10/2008 | |
| WO | WO 2017/072281 | 5/2017 | |

OTHER PUBLICATIONS

M.Sc. Zeeshan Shareef, Path Planning and Trajectory Optimization of Delta Parallel Robot, 2015.

Office Action dated Apr. 2, 2021 issued in Chinese Patent Application No. 201810568474.4.

* cited by examiner

SET-UP ARRANGEMENT AND METHOD FOR SETTING UP A MOBILE AUTOMATION

BACKGROUND OF THE INVENTION

1. Field of the Invention

The invention relates to an arrangement and a method for setting up a mobile automaton.

2. Description of the Related Art

In order to be able to operate a mobile automaton in an automated manner and safely in a predefined working area, the mobile automaton is set up previously, where working profiles or movement profiles are stored, for example, in a control device of the mobile automaton. With these profiles, the mobile automaton can operate in an automated operation. The set-up is frequently also designated as "teaching".

During the set-up there is the risk, above all in highly dynamic mobile automata, that these will perform undesired movements and as a result overstep safety-relevant limiting values and/or the working area, at least in some areas. In the worst possible case, individuals finding themselves beside the working area can be injured as a result.

SUMMARY OF THE INVENTION

It is an object of the present invention to provide a set-up arrangement and method for setting up a mobile automaton via which overstepping of a predefined speed limit or the working area can be prevented.

This and other objects and advantages are is achieved in accordance with the invention by a set-up arrangement and a method for setting up a mobile automaton, comprising at least the steps a) coupling a movable element of the mobile automaton to a movable guide element of a guide device, b) exerting a force on the movable element via the movable guide element by operating the guide device, such that the movable element is moved in a guided manner along a predetermined movement profile via the guide element, and c) acquiring a setup dataset characterizing the movement profile and, as a result, setting up the mobile automaton.

As a result of the exertion of force on the movable element of the movable guide element, a particularly controlled, guided movement of the movable element can be performed during the set-up, which means that unintended overstepping of a working area and/or a speed limiting value of the mobile automaton can be prevented effectively.

The movable element can preferably be moved only by the exertion of force via the guide element. As a result, overstepping the working area and/or the speed limiting value as a result of an operation of the mobile automaton can be ruled out, especially because the mobile automaton then does not contribute to the movement of the movable element.

During the acquisition of the setup dataset, the setup dataset can be stored in a control device configured to control the mobile automaton. The mobile automaton can comprise the control device.

The movement profile can comprise at least two coordinate points. By using the coordinate points, stopping points can be predefined, at which, after the set-up of the mobile automaton has been completed, the movable element can be stopped deliberately during an automated operation, during which, for example, order-picking processes or sorting processes can be performed via the mobile automaton.

The movement profile preferably comprises at least one curve. As a result, a particularly high degree of freedom of movement can be achieved and, for example, a movement of the movable element around an obstacle can be effected.

It is also conceivable that the movable element is adjusted by the movable guide element into at least two working states that differ from each other. This is advantageous, because in this way a particularly specific set-up of the mobile automaton can be implemented. Here, movable element can be formed, for example, as a gripping tool of the mobile automaton. The at least two working states that differ from each other can, for example, correspond to a gripping state and an opening state of the gripping tool.

The mobile automaton can advantageously exhibit greater dynamics as compared with the guide device. This is advantageous because, accordingly, the guide device has a greater dynamic inertia than the mobile automaton, which means that the guide device can be regulated and controlled more simply than the mobile automaton. It is of particular advantage here that, as a result, the guide device can be monitored more simply by a safety control system than the mobile automaton can be monitored.

In an advantageous embodiment of the invention, before or during the exertion of force in step b), the movable element can be placed into a passive state, in which the movable element is decoupled from a drive device of the mobile automaton that is configured to move the movable element. This is advantageous because, as a result, a particularly unimpeded and therefore energy-saving guided movement of the movable element via the movable guide element is made possible.

The passive state can preferably be established immediately before the exertion of force. As a result, the movable element, before the coupling of the drive device to the movable guide element, can be kept in a rest position, so that the coupling can be performed particularly unimpeded.

In the passive state, the movable element can be decoupled from a drive, so that the movable element is not moved by operating the mobile automaton but, instead, can be moved with little effort by the movable guide element.

In a further advantageous embodiment of the invention, before or during the exertion of force in step b), at least one holding brake of the mobile automaton can be switched from a braked position suppressing a movement of the movable element into a further position permitting the movement of the movable element. This is advantageous because, in this way, the movement of the movable element can be performed at least with reduced brake resistance and therefore reduced expenditure of energy.

In the further position, the holding brake can be released completely. As a result, particularly low-effort movement of the movable element is made possible.

As an alternative thereto, in the further position a braking force to be overcome to move the movable element by the exertion of force can be exerted by the holding brake. This is advantageous because, in this way, a movement of the movable element is carried out counter to this braking force, wherein, as a result of the acting braking force, particularly rapid braking of the movable element can be performed as soon as the exertion of force is interrupted or completed. As a result, particularly high safety is ensured during the set-up.

In a further advantageous embodiment of the invention, during the exertion of force in step b) the movable element is held by the guide element counter to a force of gravity acting on the movable element. This advantageously makes it possible to release the movable element before a braking action of the mobile automaton preventing a downfall, so that the movable element can be moved particularly unimpeded by the movable guide element.

In a further advantageous embodiment of the invention, during the acquisition of the setup dataset in step c), at least one sensor value from a movement sensor assigned to the mobile automaton is used. This is advantageous, because the setup dataset can be based on a coordinate system of the movement data set already during the set-up as a result of the use of the movement sensor assigned to the mobile automaton. As a result, a conversion of the movement profile between different coordinate systems, such as by coordinate transformation, can advantageously be dispensed with.

In a further advantageous embodiment of the invention, a multi-axis robot, in particular a delta-picker, is used as the mobile automaton. This is advantageous because, in this way, there are particularly many degrees of freedom in the movement of the movable element. Here, the term "multi-axis robot" is to be understood in particular to be a robot provided with multiple movement axes. The mobile automaton can accordingly be constructed as a multi-element robot, where the movable element can correspond to an element of the robot or a tool.

In a further advantageous embodiment of the invention, a multi-element guide robot, in particular a selective compliance assembly robot arm (SCARA robot), is used as the guide device. This is advantageous because, because of the different elements of the guide robot, there are particularly many degrees of freedom in the movement. Here, the term "guide robot" is to be understood to mean that the guide device can be constructed as a robot, by means of which the movement of the movable element of the mobile automaton can be carried out in a guided manner.

The guide device can preferably also be constructed as a SCARA robot. Such a robot is advantageously similar to a human arm in its movement.

In a further advantageous embodiment of the invention, the movement profile comprises at least one speed profile and/or at least one acceleration profile of the movable element. This is advantageous, because the dynamics of the movement profile can be predefined by the speed profile or the acceleration profile. This makes it possible to take movement times into account as well when setting up the mobile automaton.

In a further advantageous embodiment of the invention, the at least one speed profile is proportional to a working speed profile of the movable element, which changes over time. This is advantageous because, in this way, a conversion between the speed profile set during the set-up and the working speed profile can be performed via a constant speed factor and therefore with particularly little effort. The working speed profile comprises the speeds predefined during the automated operation and therefore during the automated working (automated operation) of the mobile automaton, which can also be designated as working speeds.

In a further advantageous embodiment of the invention, the at least one acceleration profile is proportional to a working acceleration profile of the movable element, which changes over time. This is advantageous because, in this way, a conversion between the acceleration profile established during the set-up and the working acceleration profile can be performed via a constant acceleration factor and therefore with particularly little effort. The working acceleration profile comprises the accelerations predefined during the automated operation and therefore during automated working of the mobile automat, which can also be designated as working accelerations.

It is also an object of the invention to provide a set-up arrangement that comprises a mobile automaton having a movable element and a guide device with a movable guide element, in which arrangement the movable element of the mobile automaton is coupled to the movable guide element of the guide device, which is configured to exert a force on the movable element via the movable guide element by operating the guide device, such that the movable element can be moved in a guided manner along a predetermined movement profile by the movable guide element, and such that a setup dataset characterizing the movement profile can be acquired and, as a result, the mobile automaton can be set up. With the set-up arrangement, impermissible overstepping of a working area and/or the speed limiting value of the mobile automaton during the setting up of the mobile automaton can be prevented. The setting-up arrangement is designed to carry out a method according to the first aspect of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will now be explained in more detail by using the appended drawings, in which.

DETAILED DESCRIPTION OF THE EXEMPLARY EMBODIMENTS

The exemplary embodiments outlined in more detail below constitute preferred embodiments of the present invention. It should be noted that the individual features can be implemented not only in the outlined combinations but also on their own or in other technically expedient combinations. In particular, combinations with the features from the prior art mentioned at the beginning can also be made.

Figure 1:
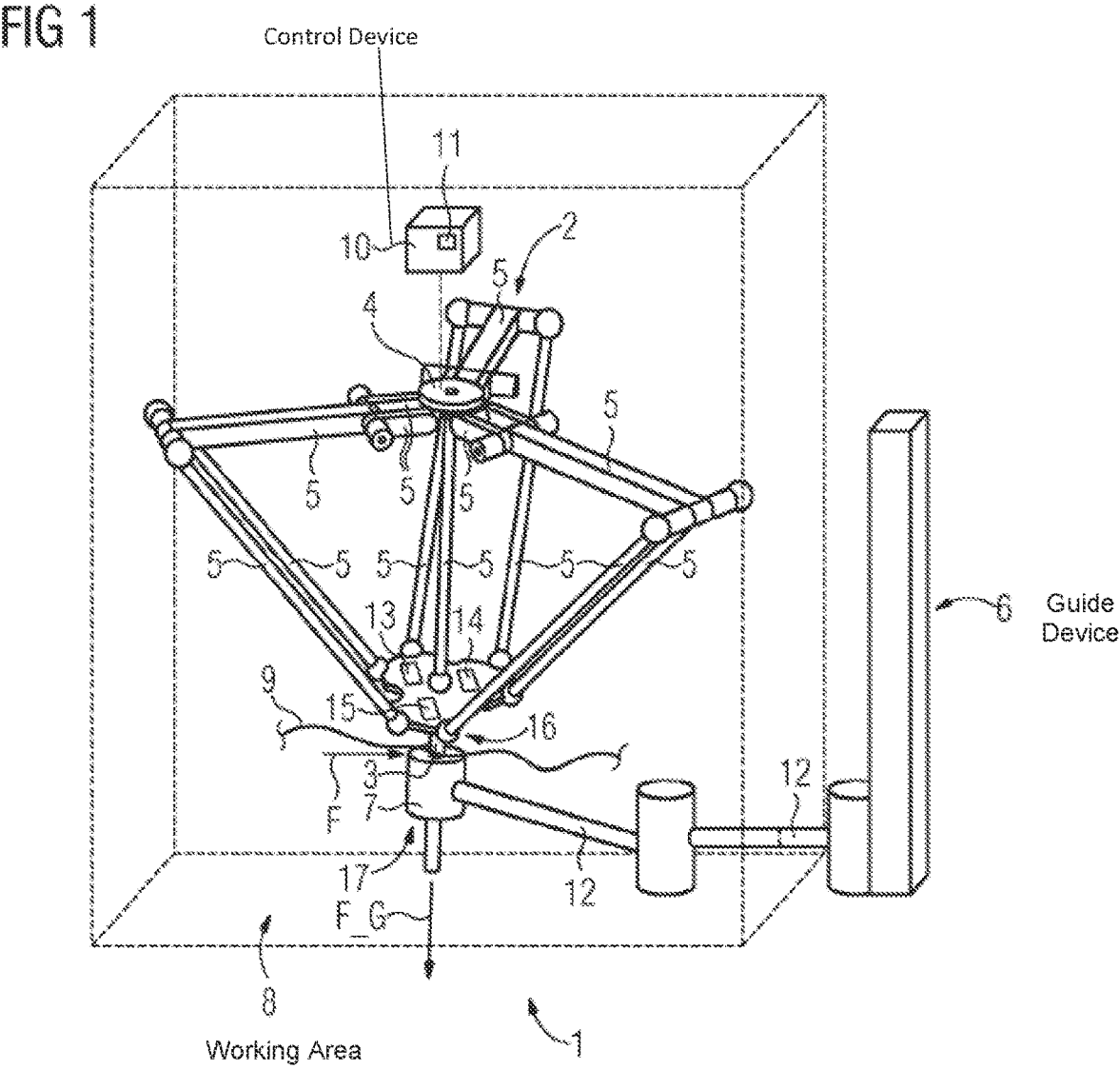
FIG. 1 shows a perspective view of a setting-up arrangement comprising a mobile automaton and a guide device.

FIG. 1 shows a perspective view of a set-up arrangement 1, which comprises a mobile automaton 2, having a movable element 3 and a guide device 6 with a movable guide element 7. The mobile automaton 2 is constructed as a delta-picker in the present case. The guide device 6 is formed as a SCARA robot in the present case.

Here, the movable element 3 is formed as a tool of the mobile automaton 2 and is arranged at a free end 16 of the mobile automaton 2.

The movable guide element 7 is arranged at a free end 17 of the guide device 6 in the present case. The guide element 7 can be moved in a guided manner via multiple guide elements 12 of the guide device 6 by a drive of the guide device 6, not shown further, here.

The movable element 3 is connected via a plurality of movable elements 5 of the mobile automaton 2 to a base 4 of the mobile automaton 2 and, as a result, is movable relative to the base 4. The mobile automaton 2 can, for example, be movably supported on a hall ceiling via the base 4.

In order to operate the mobile automaton 2 in an automated manner and in the process to move the movable element 3, such as relative to the base 4, the mobile automaton 2 comprises a drive device 13, illustrated merely schematically here. In addition, the mobile automaton 2 comprises a holding brake 14, via which the movable element 3 can be held fast. The drive device 13 and the holding brake 14 are coupled in a signal-transmitting manner to a control device 10 of the mobile automaton 2. As a result, the drive device 13 can be activated via the control device 10 in order to move the movable element 3 specifically and, for example, to perform order-picking processes or sorting processes during the automatic operation of the mobile automaton 2. In addition, the holding brake 14 can be switched via the control device 10 between a braked position, in which the movement of the movable element 3 is made possible, and at least one further position.

The movable element 3 of the mobile automaton 2 is coupled to the movable guide element 7 of the guide device 6 in the set-up arrangement 1. As a result, the movable guide element 7 receives the movable element 3 counter to the force of gravity F_G acting on the movable element 3.

The set-up arrangement 1 is configured to exert a force on the movable element 3 via the movable guide element 7 by operating the guide device 6.

As a result of the exertion of force, the movable element 3 can be moved in a guided manner by the movable guide element 7 along a predetermined movement profile 9 within a working area 8 of the mobile automaton 2.

In order to acquire a setup dataset 11 characterizing the movement profile 9, via which the mobile automaton 2 can be operated in an automated manner, the mobile automaton 2 comprises a movement sensor 15 which, in the present case, is arranged on the movable element 3, and which is configured to acquire the position, to acquire the speed and to acquire the acceleration. The setup dataset 11 acquired via the movement sensor 15 can be stored in the control device 10 to set up the mobile automaton 2.

After the set-up has been performed, the mobile automaton 2 can be operated in an automated manner based on the setup dataset 11.

Figure 2:
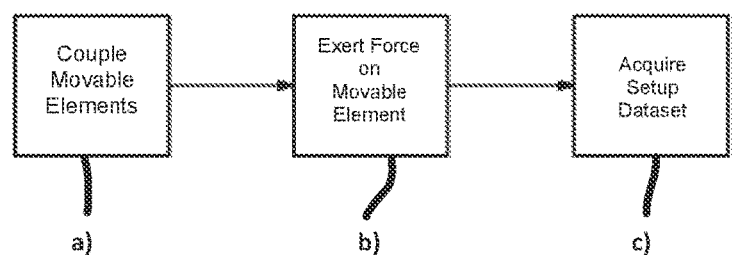
FIG. 2 shows a flowchart of a method for setting up the mobile automaton.

The set-up arrangement 1 is generally configured to perform a method for setting up the mobile automaton 2, where individual method steps a), b) and c) are illustrated schematically in the flowchart shown in FIG. 2.

In step a), the coupling of the movable element 3 of the mobile automaton 2 to the movable guide element 7 of the guide device 6 is performed.

In step b), the force is exerted on the movable element 3 by the movable guide element 7 by operating the guide device 6, via the movable element 3 is moved in a guided manner along the predetermined movement profile 9 by the guide element 7.

In step c), the setup dataset 11 characterizing the movement profile 9 is acquired and, as a result, the mobile automaton 2 is set up.

In the present case, before the exertion of force in step b), the movable element 3 is put into a passive state, in which the movable element 3 is decoupled from the drive device 13 of the mobile automaton 2 that is configured to move the movable element 3.

Before the exertion of the force in step b), in addition the holding brake 14 of the mobile automaton 2 is switched from the braked position suppressing the movement of the movable element 2 into the further position permitting the movement of the movable element 3. In the further position, the holding brake 14 is completely or at least partly released in the present case, such that the movable element 3 can be moved with particularly little resistance.

In order to acquire the setup dataset 11 in step c), respective sensor values from the movement sensor 15 assigned to the mobile automaton are used.

The movement profile 9 comprises a speed profile and an acceleration profile of the movable element 3. The speed profile and the acceleration profile characterize the dynamics and therefore the time-dependence of the movement profile.

The speed profile is proportional to a working speed profile of the movable element 3, which changes over time.

The speed profile of the movable element that is established during the set-up and the working speed profile of the movable element, which is proportional to the speed profile, each change over time and over the movement profile.

The acceleration profile, on the other hand, is proportional to a working acceleration profile of the movable element 3, which changes over time.

The acceleration profile of the movable element which is established during the set-up, and the working acceleration profile of the movable element, which is proportional to the acceleration profile, each change over time and over the movement profile.

During the automated operation (after the set-up has been performed) of the mobile automaton 2, the latter can be moved in accordance with the movement profile 9, in accordance with the working speed profile and in accordance with the working acceleration profile, in that the setup dataset 11 is used during automated operation to move the movable element 3 and therefore the mobile automaton 2.

The present set-up arrangement 1 permits reliable set-up and reliable monitoring of the delta-picker 2 (mobile automaton) via the SCARA robot 6 (guide device), although the delta-picker 2 has a particularly high acceleration capability. As a result of guiding the movable element 3 via the movable guide element 7 during the set-up of the delta-picker 2, situations involving danger, which include, for example, an uncontrolled break-out of the delta-picker 2 out of the working area 7 in some areas and/or overstepping a speed limiting value of the mobile automaton 2, can be avoided.

With the SCARA robot 6, which is dynamically more sluggish as compared with the delta-picker 2, stopping the movable element 3 of the delta-picker 2 in good time, in particular early, during the set-up can be effected without safety-relevant limiting values being overstepped.

As a result, it is made possible to set-up the mobile automaton 2 particularly simply, for example, and in the process to move manually to individual points of the movement profile 9 in order as a result to predefine the movement profile 9 to the mobile automaton 2.

A particular advantage resides in the fact that, with the guide device 6, it is possible to dispense with moving the mobile automaton 2 in a cell separated physically from an operator during the set-up. During the set-up, the operator can thus come particularly close to the mobile automaton 2 and penetrate the working area 8 without thereby running the danger of being injured by an uncontrolled movement of the mobile automaton 2.

In the following, the method for setting up the mobile automaton 2 will be summarized briefly once more. Thus, before the start of the set-up, the mobile automaton 2 can be coupled via the movable element 3 to the movable guide element 7 and therefore to the guide device 6. As a result, the mobile automaton 2 is held and fixed at a predefined gripping point.

Respective drive axes of the mobile automaton 2, connecting the individual elements 5 to one another, can be switched off safely by deactivating the drive device 13. For example, a supply of power to the drive device 13 can be isolated. As a result of the isolation of the power supply, the drive device 13 can be switched into a particularly safe, i.e., safe torque off (STO) State and therefore into a state in which the drive device 13 cannot produce any torque.

The movable element 3 is held by the movable guide element 7. As a result, the holding brake 14 can additionally be released without the movable element 3 falling down because of the force of gravity F_G.

Respective drives of the guide device 6 remain active during the method, which means that the movable element 3 of the mobile automaton 2 can be guided along the movement profile 9 by the exertion of force via the movable guide element 7 of the guide device 6. The movable element 3 is then, so to speak, concomitantly moved passively together with the actively driven (moved) guide element 7.

During the set-up, the guide device 6 can also be operated manually.

During the method, various coordinate points along the movement profile 9 in the working area 8 can be moved to and recorded via the movement sensor 15 and the control device 10. The coordinate points of the movement profile 9 to be recorded can be determined directly by using the respective sensor values from the movement sensor 15. As a result, the setup dataset 11 is advantageously based on a coordinate system assigned to the mobile automaton 2.

Alternatively, the recorded coordinate points can also be determined from respective transmitter values from a sensor of the guide device 6, not illustrated further here, and converted to the coordinate system assigned to the mobile automaton 2, such as via coordinate transformation.

The (Cartesian) movement of the guide device 6 and therefore the movable guide element 7 can be monitored by a safety control system.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for setting up a mobile automaton, comprising:
    a) coupling a movable element of the mobile automaton to a movable guide element of a guide device;
    b) exerting a force on the movable element via the movable guide element by operating the guide device such that the movable element is moved in a guided manner along a predetermined movement profile via the movable guide element, before or during the exertion of force, the movable element being placed in a passive state, in which the movable element is decoupled from a drive device which is configured to move the movable element; and
    c) acquiring a setup dataset characterizing the predetermined movement profile and, as a result, setting up the mobile automaton such that the mobile automaton is prevented from overstepping a predefined working area of the mobile automaton.

2. The method as claimed in claim 1, wherein before or during the exertion of force in step b), at least one holding brake of the mobile automaton is switched from a braked position in which a movement of the movable element is suppressed into a further position in which the movement of the movable element is permitted.

3. The method as claimed in claim 1, wherein during the exertion of force in step b) the movable element is held by the movable guide element in a manner counter to a force of gravity acting on the movable element.

4. The method as claimed in claim 1, wherein during the acquisition of the setup dataset in step c), at least one sensor value from a movement sensor assigned to the mobile automaton is utilized.

5. The method as claimed in claim 1, wherein the mobile automaton comprises a multi-axis robot.

6. The method as claimed in claim 5, wherein the multi-axis robot comprises a delta-picker.

7. The method as claimed in claim 1, wherein the guide device comprises a multi-element guide robot.

8. The method as claimed in claim 7, wherein the multi-element guide robot comprises a selective compliance assembly robot arm (SCARA) robot.

9. The method as claimed in claim 1, wherein the predetermined movement profile comprises at least one of (i) at least one speed profile and (ii) at least one acceleration profile of the movable element.

10. The method as claimed in claim 9, wherein the at least one speed profile is proportional to a working speed profile of the movable element, said working speed profile changing over time.

11. The method as claimed in claim 10, wherein the at least one acceleration profile is proportional to a working acceleration profile of the movable element, said working acceleration profile changing over time.

12. The method as claimed in claim 9, wherein the at least one acceleration profile is proportional to a working acceleration profile of the movable element, said working acceleration profile changing over time.

13. A setting-up arrangement, comprising:
    a guide device having a movable guide element; and
    a mobile automaton having a movable element which is coupled to the movable guide element of the guide device, said guide device being configured to exert a force on the movable element via the movable guide element upon operation of the guide device such that the movable element is moveable in a guided manner along a predetermined movement profile by the movable guide element, and via which a setup dataset characterizing the predetermined movement profile is acquired and, as a result, the mobile automaton is set up such that the mobile automaton is prevented from overstepping a predefined working area of the mobile automaton;
    wherein, before or during the exertion of force, the movable element is placed in a passive state, in which the movable element is decoupled from a drive device which is configured to move the movable element.

* * * * *